(12) United States Patent
Pook (10) Patent No.: US 10,994,500 B1
(45) Date of Patent: May 4, 2021

(54) SYSTEM AND METHOD FOR A COMPOSITE PANEL

(71) Applicant: THE BOEING COMPANY, Chicago, IL (US)

(72) Inventor: David Pook, Victoria (AU)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/688,466

(22) Filed: Nov. 19, 2019

(51) Int. Cl.
| | |
|---|---|
| *B32B 3/00* | (2006.01) |
| *B29C 70/30* | (2006.01) |
| *B33Y 10/00* | (2015.01) |
| *B33Y 80/00* | (2015.01) |
| *B29C 64/153* | (2017.01) |
| *B64F 5/10* | (2017.01) |
| *B64C 1/12* | (2006.01) |
| *B64C 3/26* | (2006.01) |
| *B29C 70/54* | (2006.01) |
| *B64C 1/00* | (2006.01) |
| *B29L 31/30* | (2006.01) |
| *B32B 3/08* | (2006.01) |

(52) U.S. Cl.
CPC ............ *B29C 70/30* (2013.01); *B29C 64/153* (2017.08); *B29C 70/54* (2013.01); *B33Y 10/00* (2014.12); *B33Y 80/00* (2014.12); *B64C 1/12* (2013.01); *B64C 3/26* (2013.01); *B64F 5/10* (2017.01); *B29L 2031/3076* (2013.01); *B32B 3/00* (2013.01); *B32B 3/08* (2013.01); *B64C 2001/0072* (2013.01)

(58) Field of Classification Search
CPC .. B32B 3/08; B32B 3/30; B29C 70/30; B29C 70/54; B29C 70/543; B29C 70/68; B29C 70/84
USPC .......................................... 52/309.13, 309.16
See application file for complete search history.

(56) References Cited

U.S. PATENT DOCUMENTS

| | | | |
|---|---|---|---|
| 6,692,681 | B1 | 2/2004 | Lunde |
| 9,440,402 | B2 | 9/2016 | Pook et al. |
| 2004/0056151 | A1 | 3/2004 | Dichiara et al. |
| 2015/0137427 | A1 | 5/2015 | Matsen et al. |
| 2018/0290403 | A1 | 10/2018 | Hasan et al. |
| 2019/0126349 | A1 | 5/2019 | Sherman et al. |

*Primary Examiner* — Alexander S Thomas (74) *Attorney, Agent, or Firm* — Armstrong Teasdale LLP (57) ABSTRACT

A method of manufacturing a composite panel for an air vehicle having a predetermined size and shape. The method includes forming a frame including an outer mold line surface and at least one edge extending from the outer mold line surface. The outer mold line surface includes an OML inner surface. The edge includes an edge inner surface and an edge outer surface opposite the edge inner surface. The OML inner surface and the edge inner surface define a cavity. The method also includes positioning a plurality of uncured plies within the cavity. The OML inner surface and the edge inner surface support the uncured plies during a curing process. The method further includes curing the uncured plies using the curing process. A post-cure size and shape of the cured plies and the frame corresponds to the predetermined size and shape without trimming any of the cured plies.

20 Claims, 12 Drawing Sheets

SYSTEM AND METHOD FOR A COMPOSITE PANEL

FIELD

The field of the disclosure relates generally to composite panels and, more specifically, to a system and method for a framed composite panel.

BACKGROUND

Formed composite structures or panels are commonly used in applications, such as aircraft and vehicles, where a light weight, high strength structure is needed. These applications may require complex contoured parts that must be formed and then cured. Conventionally, the manufacture of complex contoured composite structures has included extensive hand labor prior to and after curing. For example, pre-impregnated composite fiber plies ("pre-pregs") such as epoxy impregnated carbon fiber laminates are placed or "laid up" by hand over a shaped form or mandrel. The laminate structure is then cured, such as by heat curing. This method results in a contoured composite structure that generally matches the shape of the mandrel. However, manual lay-up of pre-preg plies or dry fabric is a time-consuming and laborious task. For example, a technician may be required to retrieve individual plies from a ply cutting station and then physically walk the plies along the mandrel to manually locate the plies thereon.

Additionally, after curing of the pre-preg plies or dry fabric, edges of the cured composite fibers are typically frayed and distorted by the pressure of the curing process. Additionally, while the plies are constructed to engineering tolerances, the engineering tolerances are very loose due to the difficulty of placing the plies on the mandrel. More specifically, the plies stick to the mandrel and remain place once located on the mandrel. As such, the plies cannot be accurately placed in the correct location within the mandrel, and the final size of the cured composite fibers does not correspond to the final specified size of the composite structures. Thus, the cured composite fibers must be manually or automatically cut or trimmed to the final, specified shape and size. Specifically, the cured composite fibers may be manually trimmed using a hand router guided by a trim fixture or the cured composite fibers may be automatically trimmed using a 3-5 axis computer numerical control machine. However, manually or automatically trimming the cured composite fibers is a time-consuming and laborious task, and may introduce process variations that lead to undesired inconsistencies in the finished structures. Moreover, the equipment required to trim the cured composite fibers is expensive, and the processing time adds considerable manufacturing cost to the composite structures.

Further, the cured composite fibers are typically sealed (and painted) after curing to protect the composite fibers from the elements and to prevent edge glow. Sealing the cured composite fibers is also a time-consuming and laborious task, and manual sealing may introduce process variations that lead to undesired inconsistencies in the finished structures. Finally, when the composite panels are assembled on the vehicle, a gap is typically formed between adjacent composite panels. The gaps must be manually filled with a sealant, which is also a time-consuming and laborious task, and manual sealing the gaps may introduce process variations that lead to undesired inconsistencies in the finished structures.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect of the present disclosure includes a method of manufacturing a composite panel for an air vehicle having a predetermined size and shape. The method includes forming a frame including an outer mold line surface and at least one edge extending from the outer mold line surface. The outer mold line surface includes an OML inner surface and a windswept surface opposite the OML inner surface. The edge includes an edge inner surface and an edge outer surface opposite the edge inner surface. The OML inner surface and the edge inner surface define a cavity. The method also includes positioning a plurality of uncured plies within the cavity. The OML inner surface and the edge inner surface support the uncured plies during a curing process. The method further includes curing the uncured plies using the curing process. A post-cure size and shape of the cured plies and the frame corresponds to the predetermined size and shape without trimming any of the cured plies.

Another aspect of the present disclosure includes a composite panel for an air vehicle. The composite panel includes an outer mold line surface, an edge, and plies. The outer mold line surface includes an OML inner surface and a windswept surface opposite the OML inner surface. The edge extends along at least a portion of the outer mold line surface. The edge includes an edge inner surface and an edge outer surface opposite the edge inner surface. The OML inner surface and the edge inner surface define a cavity. The plies are positioned within the cavity. The plies have an outer edge that is untrimmed. The edge outer surface is an outer perimeter of the composite panel.

Yet another aspect of the present disclosure includes a composite panel system for an air vehicle. The composite panel system includes a first composite panel and a second composite panel positioned adjacent the first composite panel. The first composite panel includes a first outer mold line surface and first plies. The first outer mold line surface includes a first edge extending along at least a portion of the first outer mold line surface. The first outer mold line surface and the first edge define a first cavity. The first edge includes a first inner surface and a first outer surface opposite the first inner surface. The first outer surface includes a protrusion extending from the first outer surface having a protrusion shape. The first plies are positioned within the first cavity. The second composite panel includes a second outer mold line surface and second plies. The second outer mold line surface includes a second edge extending along at least a portion of the second outer mold line surface. The second outer mold line surface and the second edge define a second cavity. The second edge includes a second inner surface and a second outer surface opposite the second inner surface. The second outer surface defines an indentation having an indentation shape complementary to the protrusion shape such that the first outer mold line surface and the second outer mold line surface form a continuous windswept surface. The second plies positioned within the second cavity.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

Examples of the systems described include a composite panel for an air vehicle. The composite panel includes a frame and a plurality of plies positioned within the frame. The plies are positioned in the frame as uncured plies and are cured into cured plies by a heat curing process. The frame includes an outer mold line (OML) surface and an edge extending from an outer periphery of the OML surface. The edge and the OML surface support the plies during the curing process such that the size and shape of the cured plies and frame matches a final size and shape of the composite panel. That is, the frame supports the plies such that the composite panel is substantially complete after the curing process and the cured plies do not need to be trimmed after the curing process. Thus, the frame enables the composite panel to be manufactured without additional trimming, shaping or sizing, and thereby reducing the manufacturing time required and cost of the composite panel.

Additionally, the OML surface may include a windswept surface opposite the plies. The windswept surface is positioned such that the plies are not exposed to the environment during operation of the air vehicle. The plies are not sealed with a sealant to protect the rigid, cured plies from the environment, reducing the manufacturing cost of the composite panel. Moreover, the windswept surface may be a textured windswept surface that is aerodynamically shaped to improve the performance of the air vehicle. Finally, the edges may include a protrusion, and the edges of an adjacent composite panel may include an indentation complementary to the protrusion such that the OML surface and the OML surface of the adjacent composite panel form a continuous windswept surface. The protrusion and the indentation are shaped to fit together such that there is no gap, or only a minimal gap, between the composite panel and the adjacent composite panel.

Figure 1:
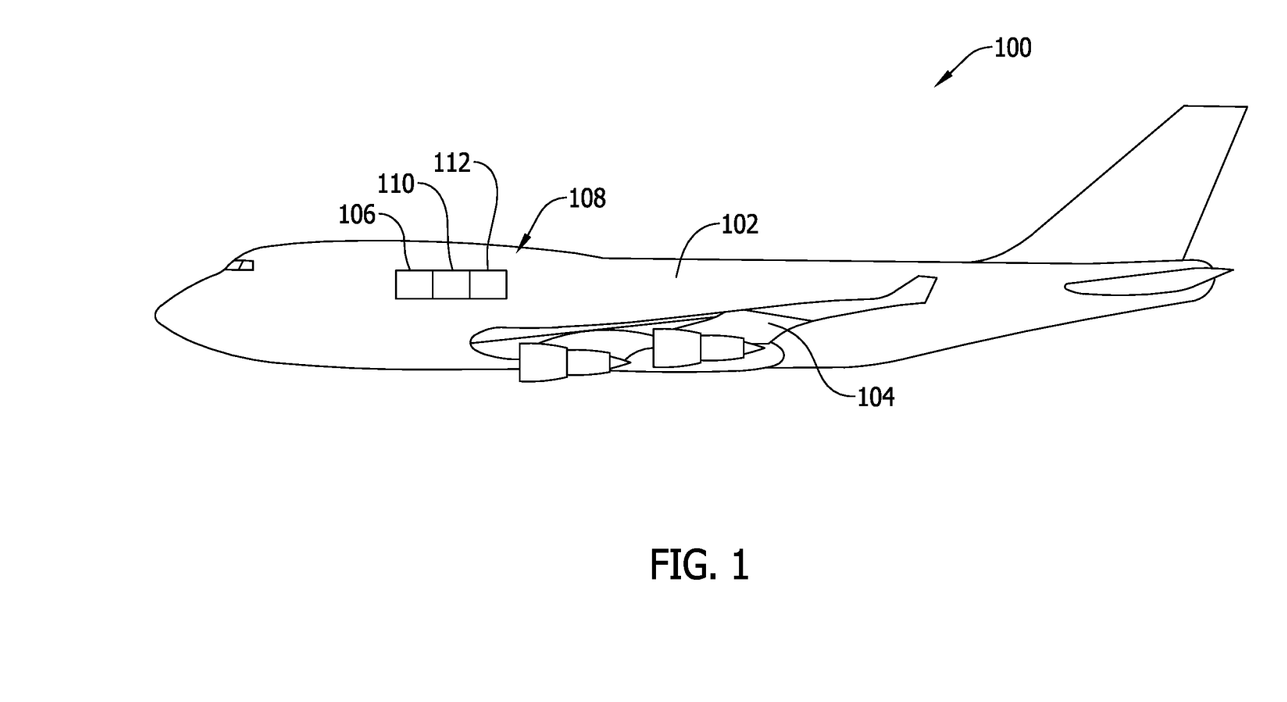
FIG. 1 is a simplified side view of an example air vehicle.

FIG. 1 is a simplified side view of a vehicle 100. In this embodiment, the vehicle 100 is an aircraft or air vehicle that includes a fuselage 102 and a wing structure 104 extending from the fuselage. In alternative embodiments, the vehicle 100 may be any vehicle including, without limitation, motor vehicles, boats, trains, spacecraft, submersible vehicles, and/or any other device configured to transport humans, animals, and/or goods from one location to another. The fuselage 102 and/or the wing structure 104 are at least partially defined by at least one composite panel 106. In the illustrated embodiment, the fuselage 102 and/or the wing structure 104 are defined by a plurality of composite panels 106 forming a composite panel system 108. Specifically, composite panel system 108 includes at least one first composite panel 110 and at least one second composite panel 112 positioned adjacent to the first composite panel.

Figure 2:
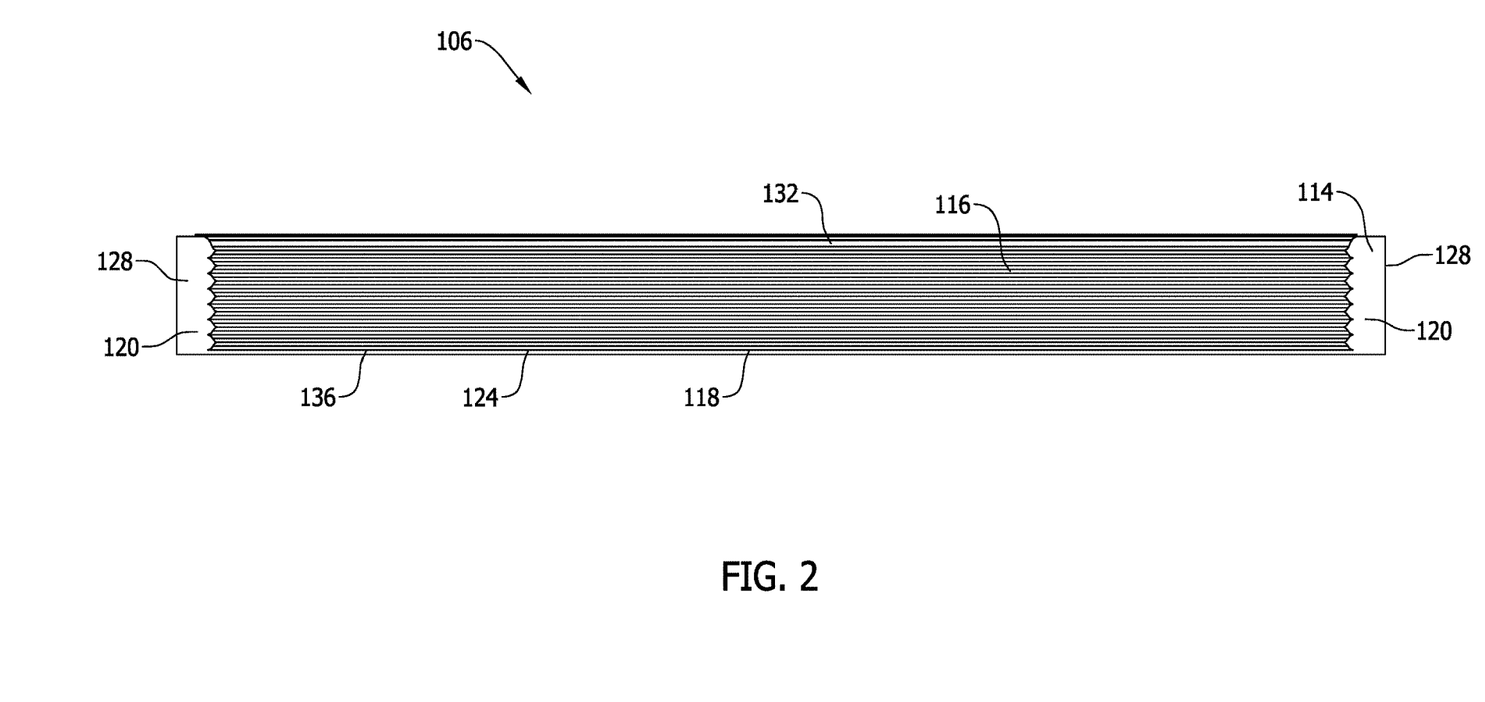
FIG. 2 is a section view of an example composite panel for use in the air vehicle shown in FIG. 1.
Figure 3:
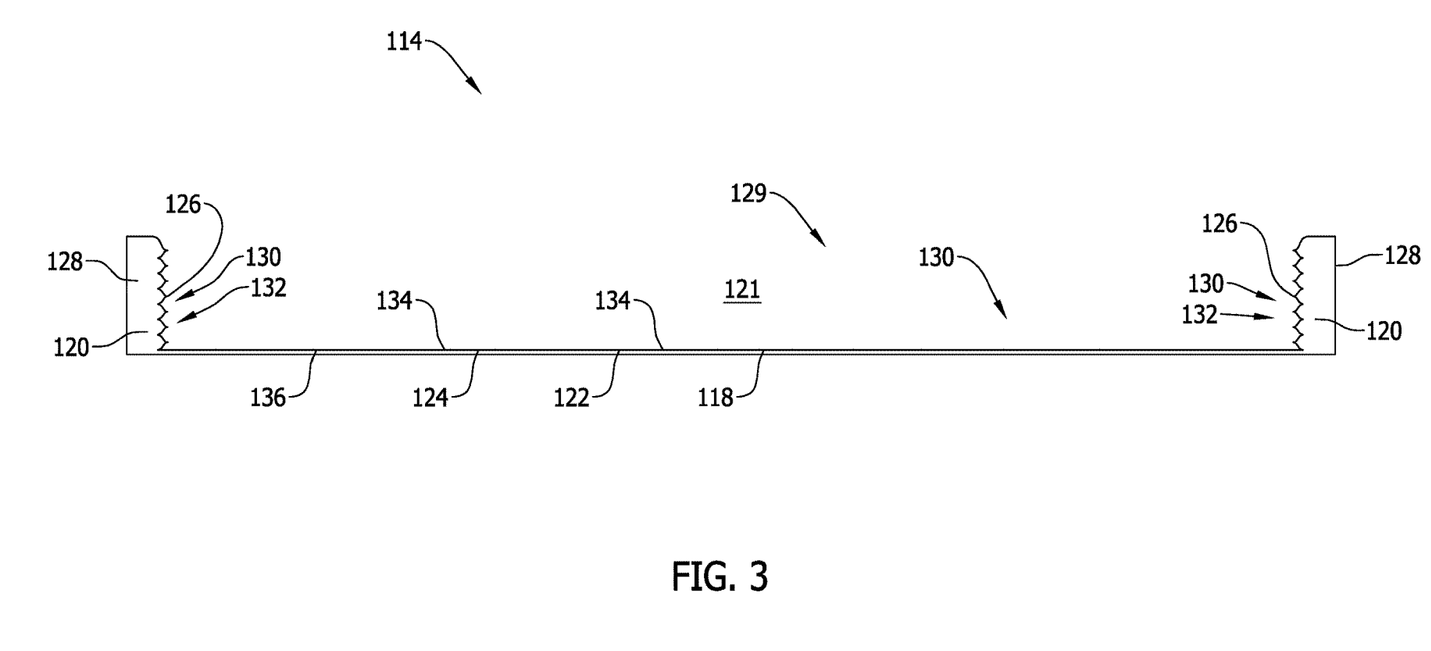
FIG. 3 is a section view of an example frame of the composite panel shown in FIG. 2.
Figure 4:
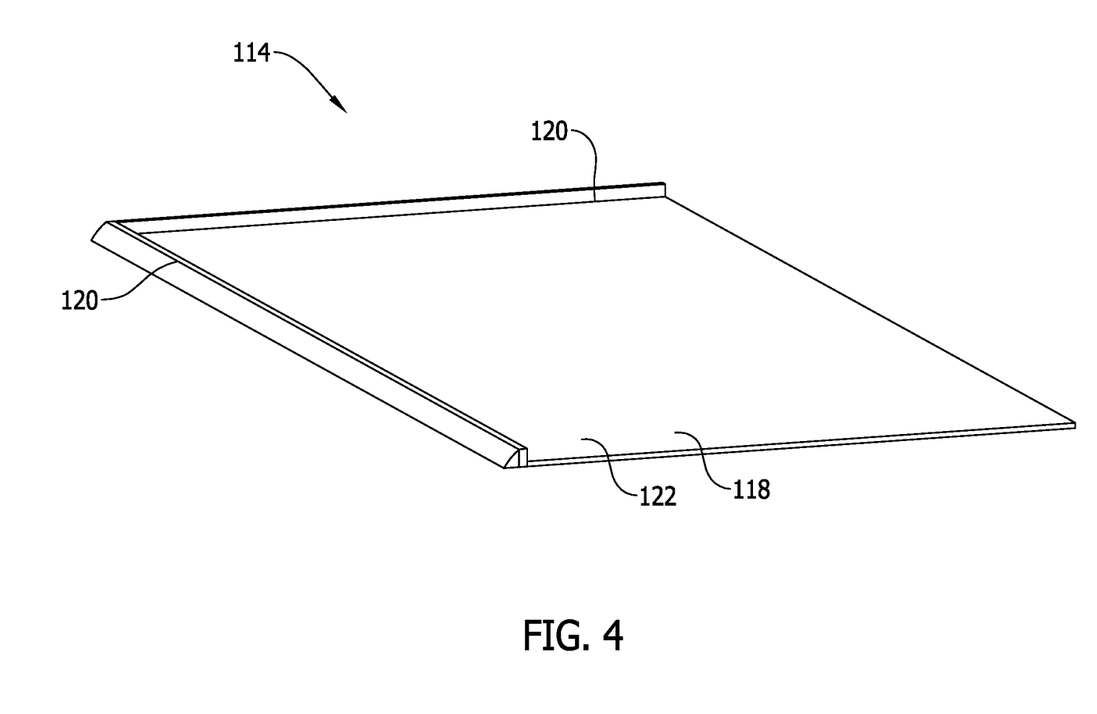
FIG. 4 is a perspective view of an example frame of the composite panel shown in FIG. 2.

FIG. 2 is a section view of the composite panel 106. FIG. 3 is a section view of a frame 114. FIG. 4 is a perspective view of the frame 114. The composite panel 106 includes a frame 114 and a plurality of plies 116 positioned within the frame. More specifically, the composite panel 106 includes the frame 114 and the plurality of plies 116 stacked within the frame. In an alternative embodiment, the composite panel 106 includes the frame 114 and at least one ply 116 positioned and/or stacked within the frame.

The frame 114 includes an outer mold line (OML) surface 118 and at least one edge 120 extending from the OML surface. The OML surface 118 is a thin layer of composite, polymeric material that forms an outer surface of the composite panel 106. However, the OML surface 118 maybe formed from any material that enables the frame 114 to operate as described herein. More specifically, the OML surface 118 has an OML inner surface 122 and a windswept surface 124 opposite the inner surface. The windswept surface 124 is the outer surface of the composite panel 106 that is exposed to the elements and forms an outer surface of the fuselage 102. The OML inner surface 122 contacts and supports the plies 116 during a curing process. In this embodiment, the OML surface 118 is a thin, flat surface. However, in alternative embodiments, the OML surface 118 may have any shape that enables the composite panel 106 to form a portion of the fuselage 102 and/or the wing structure 104. For example, the composite panel 106 and the OML surface 118 may be curved to form a portion of the cylindrical fuselage 102. In another embodiment, the composite panel 106 and the OML surface 118 may have an airfoil shape to form a portion of the wing structure 104.

The edge 120 extends substantially perpendicularly along at least a portion of the OML surface 118. The edge 120 includes an edge inner surface 126 and an edge outer surface 128 opposite the edge inner surface. In this embodiment, the edge 120 is a thin layer of composite, polymeric material that forms the edge of the composite panel 106. However, the edge 120 maybe formed from any material that enables the frame 114 to function as described herein. As shown in FIG. 4, the frame 114 may include a plurality of edges 120 positioned at an outer periphery of the OML surface 118 such that the edge outer surface 128 is an outer perimeter of the composite panel 106. The OML surface 118 and the edges define a cavity 121. In the illustrated embodiment, the cavity 121 is enclosed on five sides by the edges 120 the OML surface 118 such that, in this embodiment, the frame 114 has a box shape with an open top 129.

The plies 116 may include a carbon fabric, a carbon fiber fabric, and/or a ply of unidirectional tape. In the illustrated embodiment, the plies 116 are a flexible fabric that is cured into a rigid panel. However, the plies 116 may be any material that enables composite panel 106 to operate as described herein. The plies 116 are placed in the frame 114, and are cured to form the composite panel 106. More specifically, the plies 116 are manually stacked in the frame 114 and then cured and hardened by applying heat to the plies. As shown in FIG. 2, the plies 116 are stacked in the frame 114 such that the plies fill the cavity 121, forming a non-windswept surface 132 opposite windswept surface 124.

A shape of the frame 114 determines the final shape of the composite panel 106. More specifically, the edges 120 of the frame 114 limit distortion of the plies 116 during the stacking and curing process such that the plies curing into the final shape and size of the composite panel 106 without additional post-cure processing. In the illustrated embodiment, the composite panel 106 defines a rectangular prism with the top and bottom of the rectangular prism defined by the windswept surface 124 and the non-windswept surface 132, and the sides of the rectangular prism defined by the edge outer surfaces 128. In alternative embodiments, the frame 114 is formed of a flexible material and placed on a layup mandrel that modifies the shape of the frame and of the composite panel 106 prior to stacking the plies 116 in the frame.

As shown in FIG. 3, in order to maintain the plies 116 in position during the stacking and curing processes, the edge inner surface 126 and the OML inner surface 122 each include a plurality of projections 130 extending into the cavity 121. The projections 130 include a plurality of edge projections 132 extending from the edge inner surface 126 into the cavity 121 and a plurality of OML surface projections 134 extending from the OML inner surface 122 into the cavity 121. The projections 130 interact chemically and mechanically with the plies 116 to maintain the plies in position during the stacking and curing processes. As such, the projections 130 limit distortion of the plies 116 during the stacking and curing process such that the plies cure into the final shape and size of the composite panel 106 without additional post-cure processing. Accordingly, maintaining the plies 116 in position enables the frame 114 to form the final shape of the composite panel 106 and substantially reduce post-cure processing of the composite panel. Additionally, the edge outer surfaces 128 are net shaped, and, as such, the composite panels 106 interface with each other without additional processing. More specifically, the edge outer surfaces 128 are net shaped to eliminate the edge trimming process. Once the composite panel 106 is cured, no edge trimming is needed. The edge outer surfaces 128 define the final size of the composite panel 106 so it can be assembled with other panels and/or aircraft structure.

Figure 5:
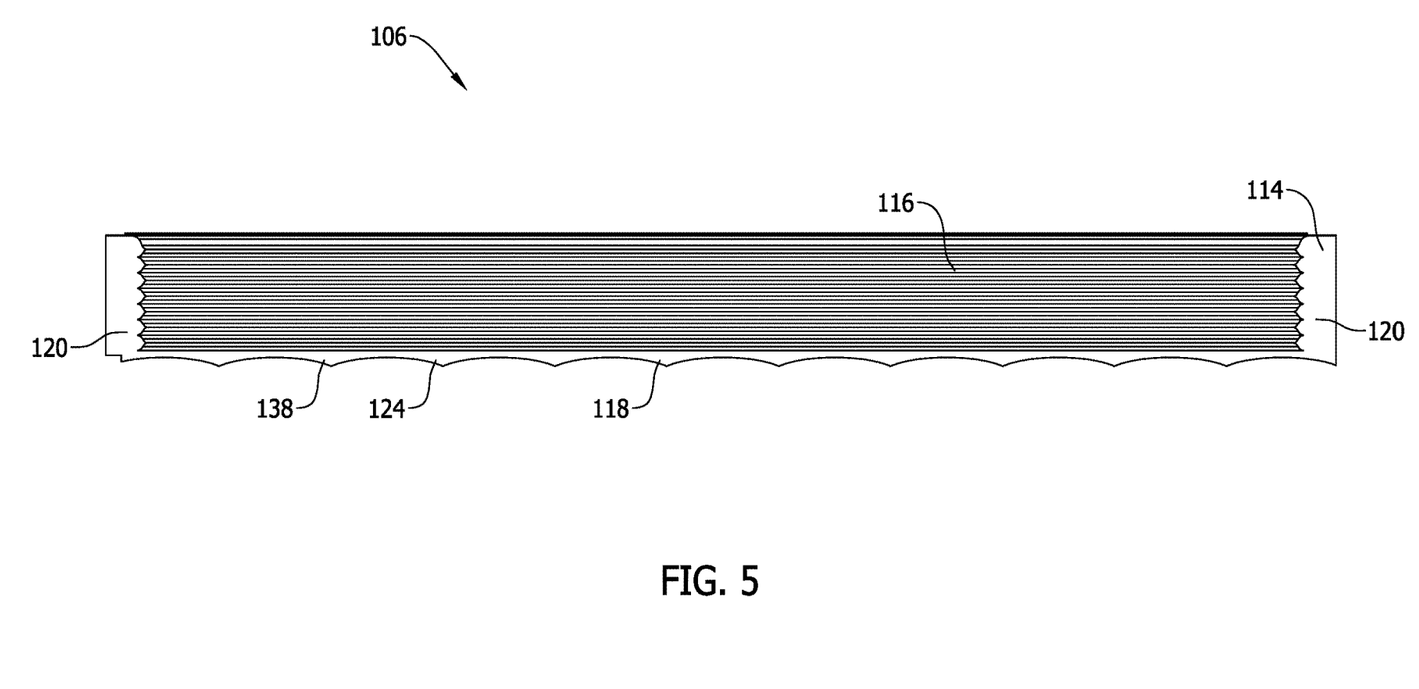
FIG. 5 is a section view of another example composite panel with a textured outer surface for use in the air vehicle shown in FIG. 1.
Figure 6:
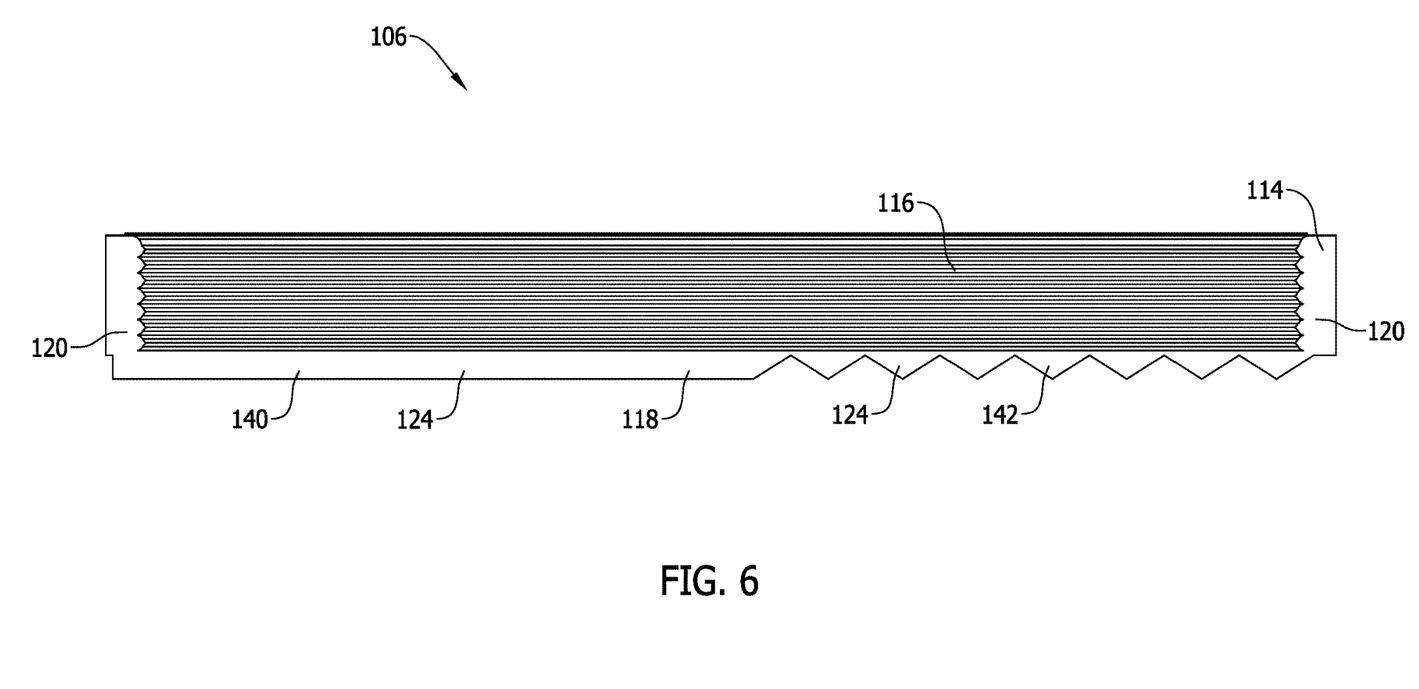
FIG. 6 is a section view of yet another example composite panel with a textured outer surface for use in the air vehicle shown in FIG. 1.

As shown in FIG. 2 the windswept surface 124 may be a smooth windswept surface 136. As used herein, the term smooth means an untextured surface that is substantially flat. However, as shown in FIGS. 5 and 6, the windswept surface 124 may also be a textured windswept surface. FIG. 5 is a section view of the composite panel 106 with a textured windswept, and FIG. 6 is another section view of the composite panel 106 with another textured windswept. As shown in FIGS. 5 and 6, the OML surface 118 may be manufactured such that the windswept surface 124 is a textured windswept surface such as an aerodynamic surface. More specifically, as shown in FIG. 5, the OML surface 118 may include a dimpled windswept surface 138 that aerodynamically optimized for the performance of the vehicle 100. As shown in FIG. 6, the OML surface 118 may include a wear strip 140 and/or a ridged windswept surface 142. The wear strip 140 is a region of the windswept surface 124 that is thicker than other regions of the windswept surface that is positioned on regions of the composite panel 106 that interfaces and/or contacts other composite panels and/or other components. The wear strip 140 is thicker to protect the composite panel 106 from contact with other composite panels and/or other components. The ridged windswept surface 142 may be aerodynamically optimized for the performance of the vehicle 100. Additionally, as shown in FIG. 6, the OML surface 118 may include different types of windswept surfaces 124 on the same composite panel 106. For example, the OML surface 118 may include the wear strip 140 and the ridged windswept surface 142.

Figure 7A:
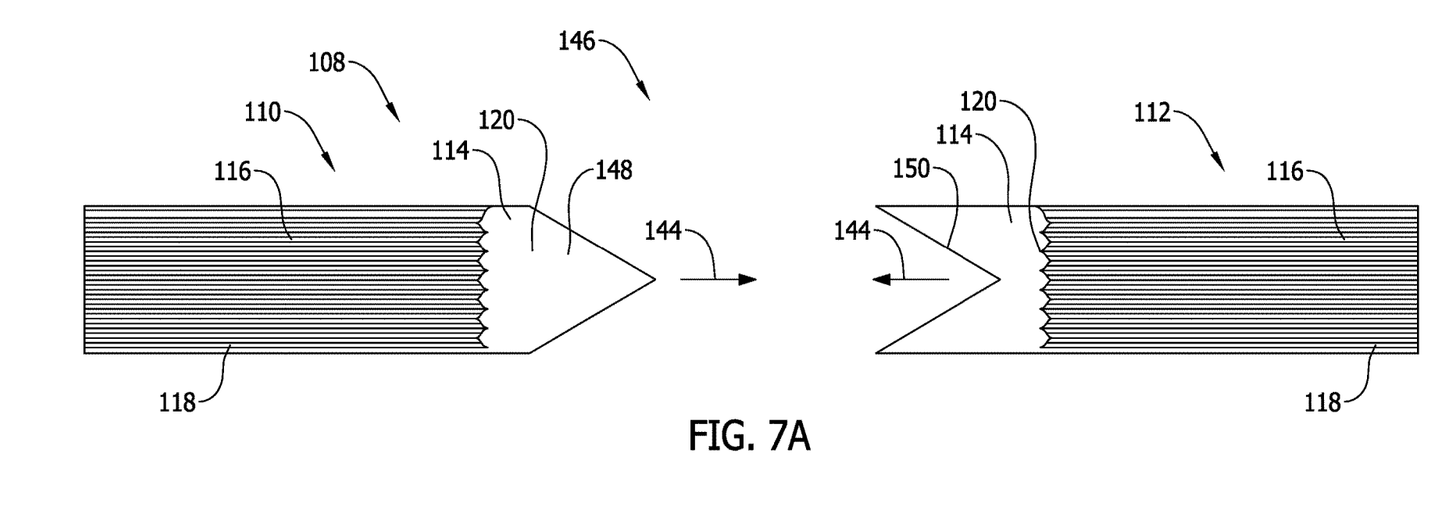
FIG. 7A is a section view of an example composite panel system with a joint edge for use in the air vehicle shown in FIG. 1.
Figure 7B:
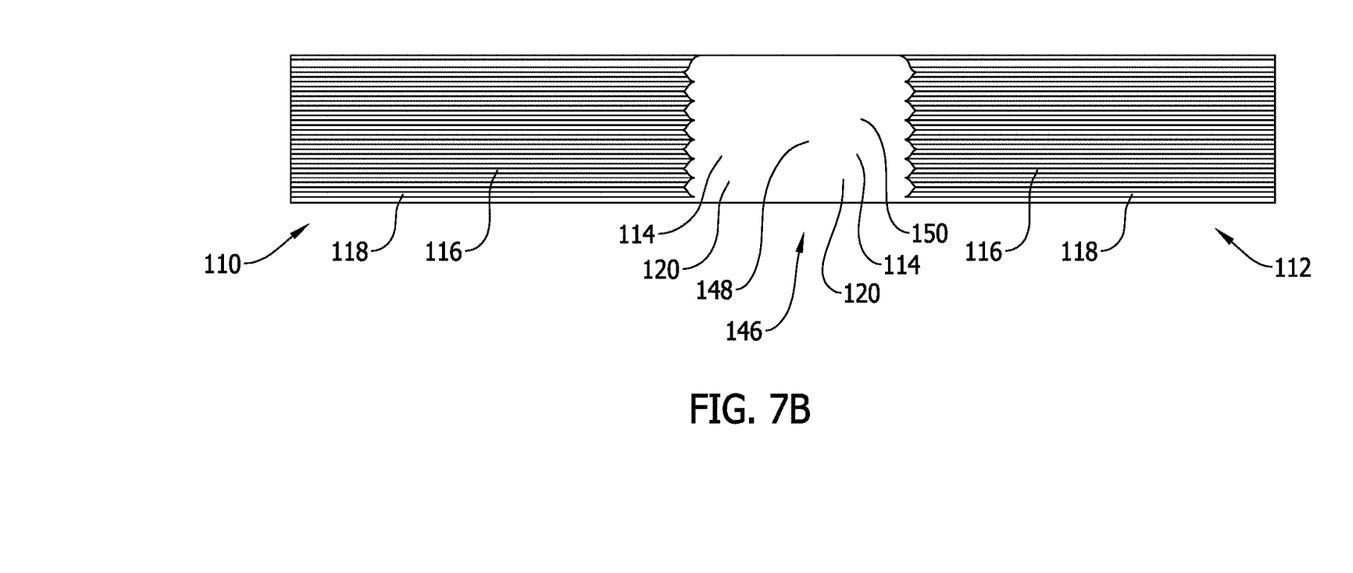
FIG. 7B is a section view of an example composite panel system with a joint edge for use in the air vehicle shown in FIG. 1.

FIG. 7A is a section view of an example composite panel system 108 with a separated joint edge 146. FIG. 7B is a section view of an example composite panel system 108 with a joined joint edge 146. The composite panel system 108 includes the first composite panel 110 and the second composite panel 112. The edge outer surfaces 128 of the first composite panel 110 includes a protrusion 148 extending from the edge outer surface having a protrusion shape, and the edge outer surfaces 128 of the second composite panel 112 defines an indentation 150 having an indentation shape complementary to the protrusion shape such that the OML surface 118 of the first and second composite panels 110 and 112 form a continuous windswept surface 152. Specifically, as shown by arrows 144, the protrusion 148 and the indentation 150 interface with each other when the first composite panel 110 and the second composite panel 112 are joined together such that no gap, or only a minimal gap, is formed between the first and second composite panels. The first composite panel 110 and the second composite panel 112 form a continuous, uninterrupted windswept surface 152 does not have a gap, or only a minimal gap. Accordingly, sealing between the first and second composite panels 110 and 112 with a sealant is not required, and the joint edge 146 assists with assembly of the composite panel system 108 because the joint edge maintains the first and second composite panels 110 and 112 in position during the assembly process.

In the this embodiment, the frame 114 is formed using an additive manufacturing process, the uncured plies 116 are manually stacked in the frame, and the uncured plies are cured into cured plies using a curing process. However, the frame 114, the plies 116, and the composite panels 106 are formed using any process and/or method that enables the composite panel to operate as described herein. For example, the frame 114 may be formed by a casting process rather than an additive manufacturing process. The curing process includes heating the uncured plies such that the uncured plies cure into cured plies. More specifically, during the curing process, the plies 116 bond to the frame 114 resulting in a complete final composite panels 106 in which no further processing is required. Typical an epoxy based composite material is cured in a temperature range of about 250° F. to about 350° F. under a pressures ranging from about 1 atmosphere (for a resin infusion process) to multiple atmospheres (for an autoclave or RTM process). At these temperatures and pressures the net shape frame and/or surface do not melt, distort or change shape.

Figure 8:
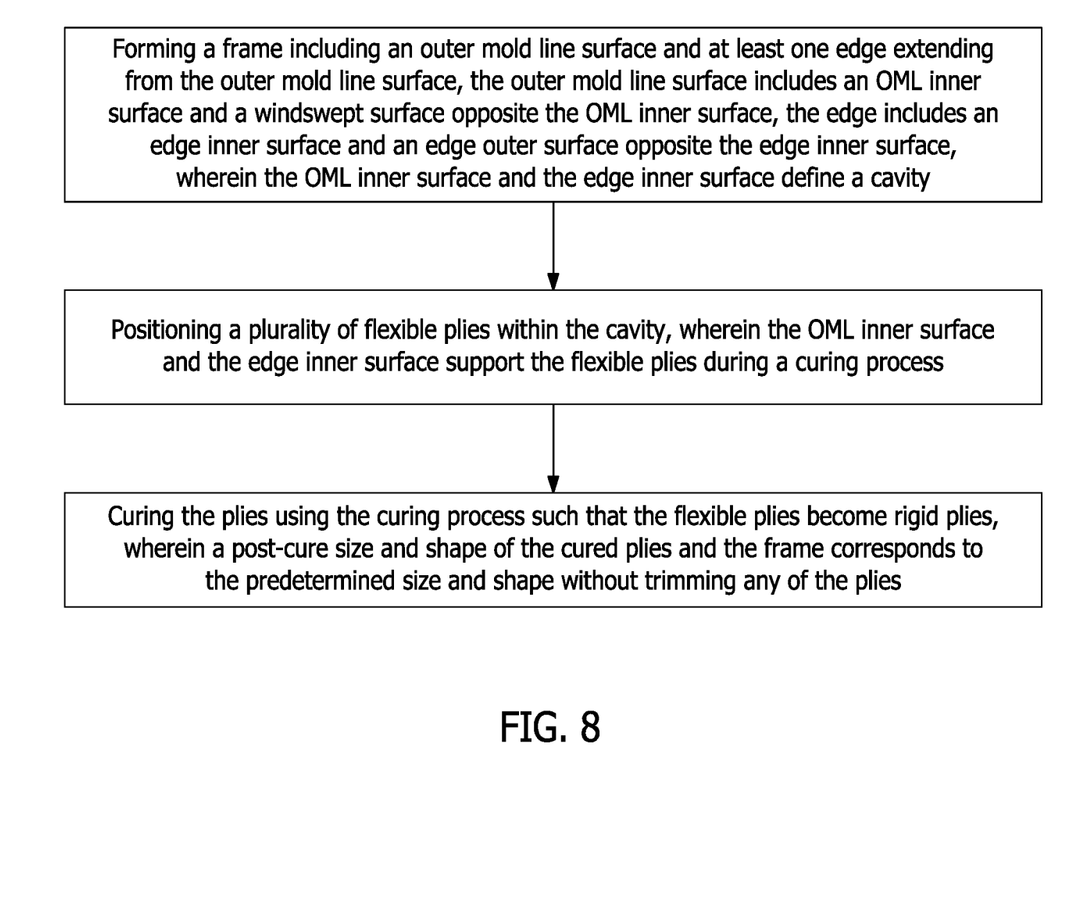
FIG. 8 is a flow diagram of an example method of manufacturing the composite panel.

FIG. 8 is a flow diagram of an example method 154 of constructing composite panel 106 for the vehicle 100 having a predetermined size and shape. The method 154 includes forming 156 the frame 114 including the OML surface 118 and the edge 120 extending from the OML surface. The OML surface 118 includes the OML inner surface 122 and the windswept surface 124 opposite the OML inner surface. The edge 120 includes the edge inner surface 126 and the edge outer surface 128 opposite the edge inner surface. The OML inner surface 122 and the edge inner surface 126 define the cavity 121. The method 154 also includes positioning 158 the uncured plies 116 within the cavity 120 where the OML inner surface 122 and the edge inner surface 126 support the uncured plies 116 during the curing process. The method 154 further includes curing 160 the plies 116 using the curing process such that the uncured plies 116 become cured plies 116. A post-cure size and shape of the cured plies 116 and the frame 114 corresponds to the predetermined size and shape without trimming any of the plies.

In this embodiment, forming 156 the frame 114 includes additively manufacturing the frame. In alternative embodiments, the frame 114 may be formed using any method that enable the frame to operate as described herein, including, without limitation casting, injection molding, and/or machining. More specifically, in this embodiment, the additive manufacturing methods used to form the frame 114 are fused deposition modeling and/or selective laser sintering. Although the additive manufacturing embodiments herein are described with reference to fused deposition modeling and selective laser sintering systems, this disclosure also applies to other types of additive manufacturing systems, including, without limitation, stereolithography, direct light processing, material jetting, binder jetting, selective laser melting, direct metal laser sintering, and/or electron beam melting systems.

Figure 9:
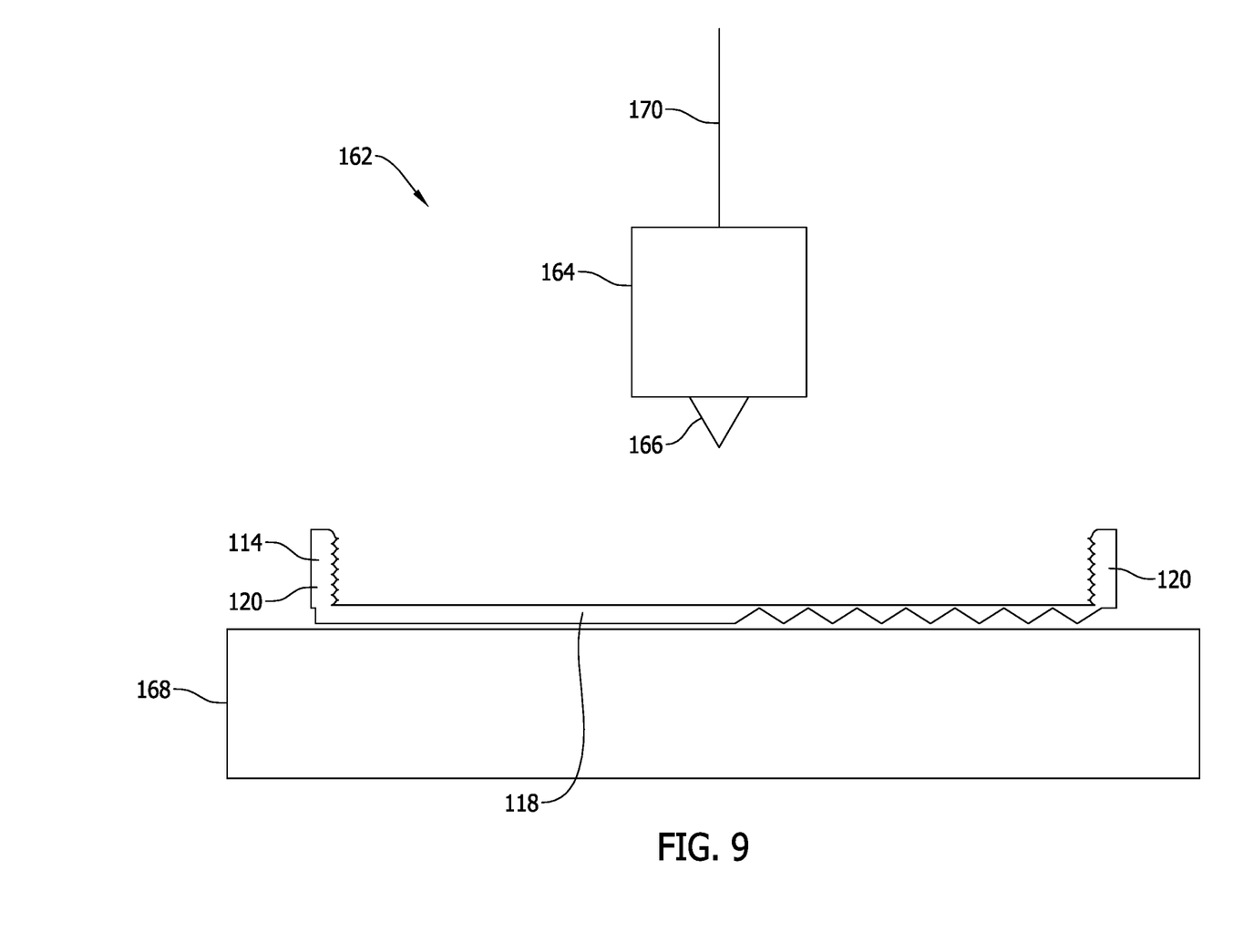
FIG. 9 is a schematic of an example fused deposition modeling system.

FIG. 9 is a schematic of a fused deposition modeling (FDM) system 162. The FDM system 162 includes an extrusion head 164, a nozzle 166, a build platform 168, and at least one filament 170. The nozzle 166 is attached to the extrusion head 164, and the filament 170 is fed to the extrusion head. The extrusion head 164 includes a heating element (not shown) that heats the filament 170 such that the filament melts within the extrusion head. The extrusion head 164 and the nozzle 166 are positioned above the build platform 168, and the extrusion head and the nozzle are movable relative to the build platform. During operation, the filament 170 is fed into the extrusion head 164, and the extrusion head melts the filament. The melted filament 170 is fed to the nozzle 166, and the nozzle deposits the melted filament onto the build platform 168 and/or the frame 114.

A computing device (not shown) controls the extrusion head 164 and/or the build platform 168 such that the nozzle 166 deposits the melted filament 170 layer-by-layer to form the frame 114. More specifically, the computing device controls a position of the extrusion head 164 and/or the build platform 168 and a flow rate of the melted filament 170 from the nozzle 166 to form the frame 114. The melted filament 170 then cools into the frame 114. Accordingly, the FDM system 162 forms the frame 114 by depositing layers of melted filament 170 on the build platform 168 and/or the frame until the frame is fully formed.

Figure 10:
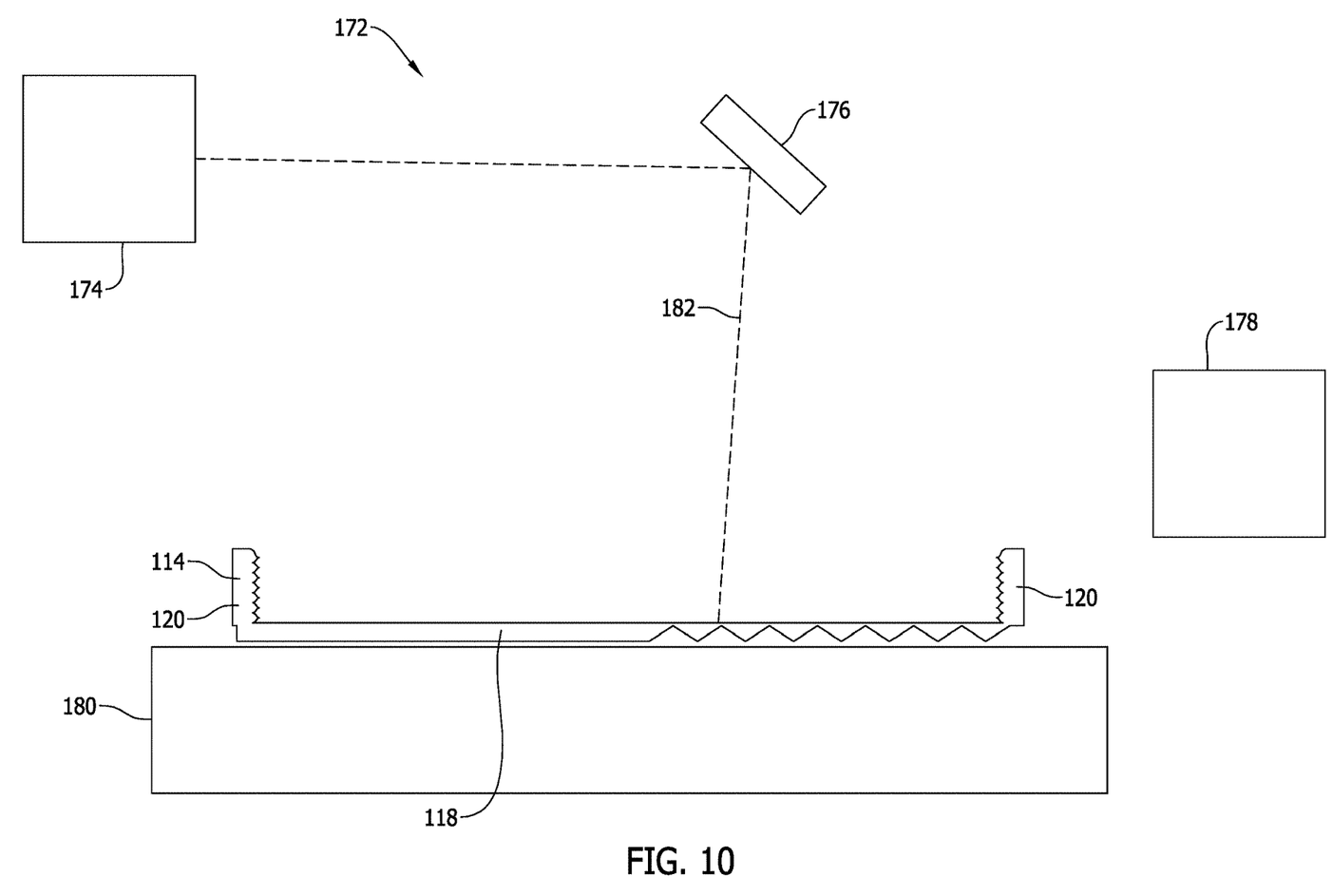
FIG. 10 is a schematic of an example selective laser sintering system.

FIG. 10 is a schematic of a selective laser sintering (SLS) system 172. The SLS system 172 includes a laser device 174, a scanner 176, a powder distribution system 178, and a build platform 180. The laser device 174 generates a laser beam 182 that is selectively directed by the scanner 176 to a powdered build material on the build platform 180. The scanner 176 includes a reflective material that selectively redirects the laser beam 182. The powder distribution system 178 distributes and coats the build platform 180 and the frame 114 with the powdered build material. During operation, the powder distribution system 178 spreads a layer of powdered build material on the build platform 180 and/or the frame 114. The laser device 174 generates laser beam 182, and the scanner 176 selectively directs the laser beam to the powdered build material. The laser beam 182 melts a portion of the powdered build material as the laser beam is moved in a predetermined pattern across the build platform 180. A computing device (not shown) controls the scanner 176 such that the laser beam 182 melts an entire layer of the frame 114. The melted powdered build material then cools and consolidates into a solid, formed portion of the frame 114. The powder distribution system 178 then spreads the next layer of powdered build material on the build platform 180 and the laser device 174 and the scanner 176 consolidate the next layer. Accordingly, the SLS system 172 forms the frame 114 by depositing and consolidating layers of powdered build material on the build platform 168 and/or the frame until the frame is fully formed.

Figure 11:
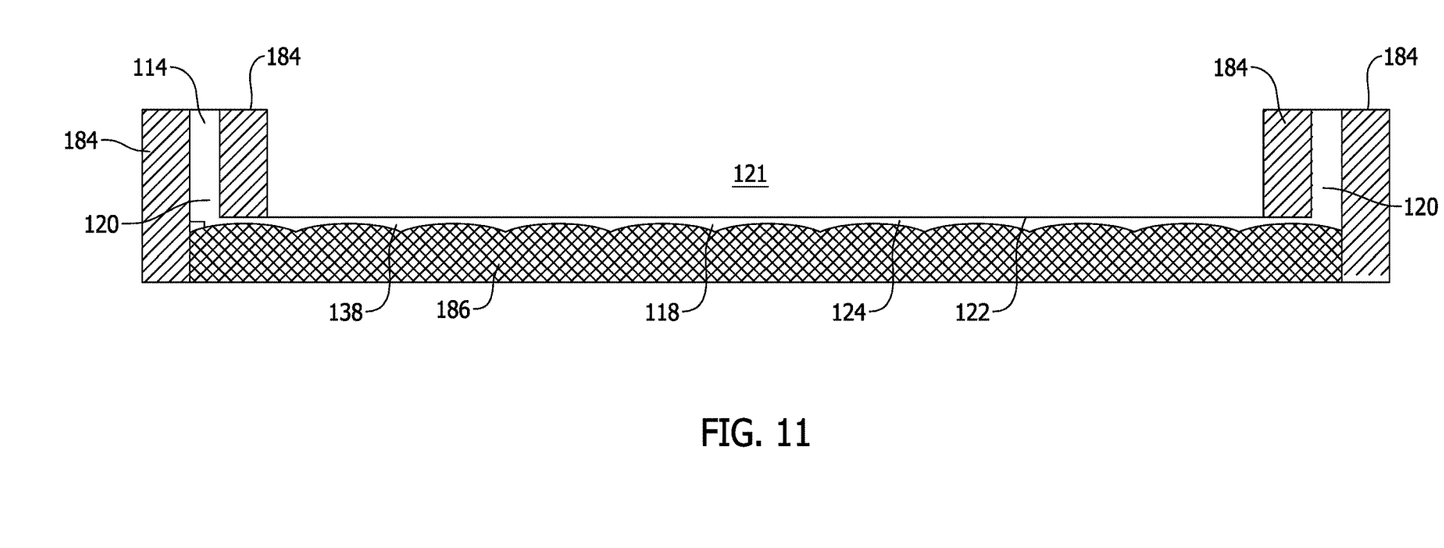
FIG. 11 is a section view of an example frame with an edge support structure and an outer mold line surface support structure.

Some the shapes and structures within the frame 114 are complex shapes that require support during the additive manufacturing process. For example, the edge 120 extends substantially perpendicularly from the OML surface 118 and may require support during the additive manufacturing process to ensure the edge is oriented properly relative to the OML surface. Additionally, the textured windswept surface 124 has complex geometries that may require support during the additive manufacturing process. FIG. 11 is a section view of the frame 114 with an edge support structure 184 and an OML surface support structure 186. The edge support structure 184 is built up around the edge 120 and supports the edge during the additive manufacturing process. In the illustrated embodiment, the edge support structure 184 is built up against the edge outer surface 128 and the edge inner surface 126 such that the edge remains substantially perpendicular during the additive manufacturing process. Additionally, the OML surface support structure 186 is built up beneath the textured windswept surface 124 such that the texture of the textured windswept surface is properly supported and formed during the additive manufacturing process.

When the FDM system 162 is used to form the frame 114, the edge support structure 184 and the OML surface support structure 186 are formed of the melted filament and cool into thin support structures that are attached to the frame. More specifically, the edge support structure 184 and the OML surface support structure 186 are frangible or thin enough to be manually separated from the frame 114 after the additive manufacturing process is complete. The edge support structure 184 and the OML surface support structure 186 are formed as parts of the frame 114 and are broke off the frame when the additive manufacturing process is complete and the edge 120 and the OML surface 118 no longer require support. Accordingly, when the FDM system 162 is used to form the frame 114, the method 154 may further include depositing successive layers of a melted filament to form the OML surface 118, depositing successive layers of the melted filament to form the edge 120, and simultaneously depositing successive layers of the melted filament around the edge to form the edge support structure 184. The method 154 may also include depositing successive layers of the melted filament to form the OML surface support structure 186, depositing successive layers of the melted filament to form the textured windswept surface 124 of the OML surface 118 on the OML surface support structure 186, and simultaneously supporting the textured windswept surface 124 using the OML surface support structure 186 as the OML surface support structure 186 is being consolidated.

When the SLS system 172 is used to form the frame 114, the edge support structure 184 and the OML surface support structure 186 are formed of unconsolidated powdered build material deposited by the powder distribution system 178 around the edge 120 and beneath the OML surface 118. More specifically, the edge support structure 184 and the OML surface support structure 186 are powdered build material that support the frame 114 during the additive manufacturing process and are brushed away after the additive manufacturing process is complete. Accordingly, when the SLS system 172 is used to form the frame 114, the method 154 may further include consolidating successive layers of the powdered build material to form the OML surface 118, consolidating successive layers of the powdered build material to form the edge 120, and simultaneously depositing successive layers of unconsolidated powdered build material around the edge to form the edge support structure 184. The method 154 may also include depositing successive layers of unconsolidated powdered build material to form the OML surface support structure 186, consolidating successive layers of a portion of the OML surface support structure 186 to form the textured windswept surface 124 of the OML surface 118, and simultaneously supporting the textured windswept surface 124 using the OML surface support structure 186 as the OML surface support structure 186 is being consolidated.

Figure 12:
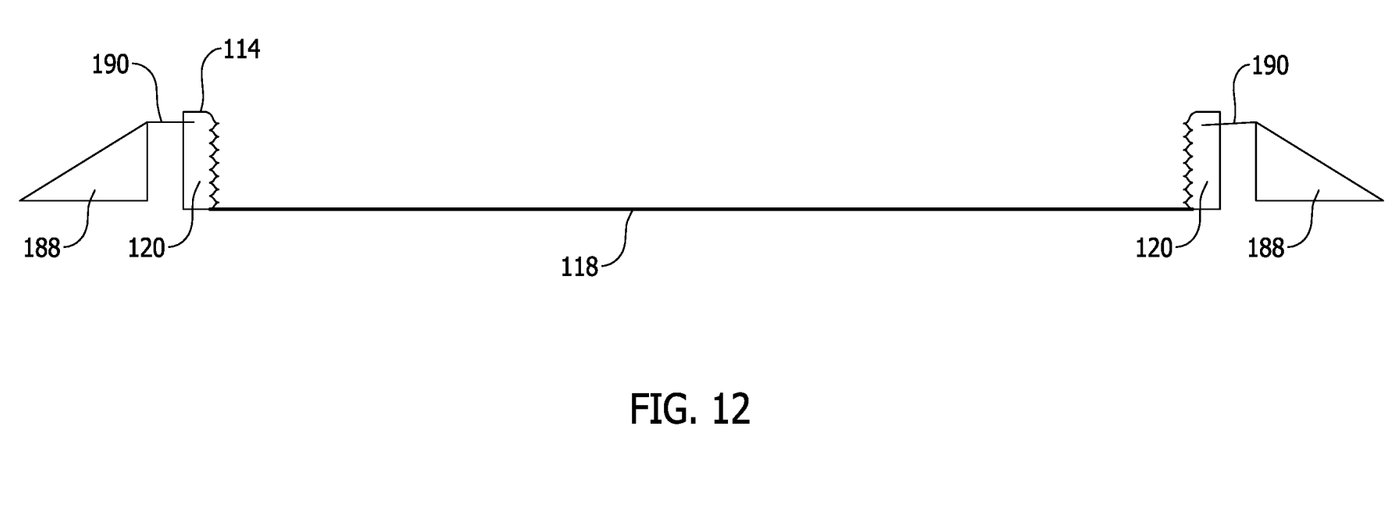
FIG. 12 is a section view of an example frame with a support structure and a connecting structure.

During the curing process, the plies 116 may expand and contract because of the heat applied to the plies, exerting pressure on the edge 120. Accordingly, the edge 120 may require support during the curing process to ensure the edge remains substantially perpendicular to the OML surface 118 during the curing process. FIG. 12 is a section view of the frame 114 with a support structure 188 and a connecting structure 190. The connecting structure 190 is coupled to the support structure 188 and the edge outer surface 128. Specifically, in the illustrated embodiment, the connecting structure 190 includes a thin strip of frangible, composite material coupled to the support structure 188 and the edge outer surface 128 such that the connecting structure is a frangible connection. The support structure 188 and the connecting structure 190 support the edge 120 during the curing process by resisting the pull and/or push of the plies 116 on the edge cause by expansion and contraction of the plies during the curing process. That is, the support structure 188 and the connecting structure 190 resist movement of the edge 120 during the curing process, ensuring that the edge is substantially perpendicular to the OML surface 118 after the curing process. After the curing process is complete, the support structure 188 and the connecting structure 190 are removed from the frame 114 by breaking and/or manually breaking the connecting structure. Accordingly, the method 154 may further include forming the support structure 188 and the connecting structure 190 coupled to the support structure and the edge outer surface 128, the support structure and the connecting structure are configured to support the edge 120 during the curing process. The method 154 may also include removing the support structure 188 and the connecting structure 190 from the frame 114 by breaking and/or manually breaking the connecting structure. The method 154 may further include additive manufacturing a thin strip of composite material 190 coupled to the support structure 188 and the edge outer surface 128.

The above described examples of the systems and methods described herein include a composite panel for a vehicle. The composite panel includes a frame and a plurality of plies positioned within the frame. The plies are positioned in the frame as uncured plies and are cured into cured plies by a heat curing process. The frame includes an OML surface and an edge extending from an outer periphery of the OML surface. The edge and the OML surface support the plies during the curing process such that the size and shape of the cured plies and frame matches a final size and shape of the composite panel. That is, the frame supports the plies such that the composite panel is substantially complete after the curing process and the cured plies do not need to be cut to a final size and shape after the curing process. As such, the frame enables the composite panel to be manufactured without additional shaping or sizing, reducing the manufacturing cost of the composite panel.

Additionally, the OML surface includes a windswept surface opposite the plies. The windswept surface is positioned such that the plies are not exposed to the environment during operation of the vehicle. As such, the plies are not sealed with a sealant to protect the rigid, cured plies from the environment, reducing the manufacturing cost of the composite panel. Moreover, the windswept surface may be a textured windswept surface that is aerodynamically shaped to improve the performance of the vehicle. Finally, the edges may include protrusion, and the edges of an adjacent composite panel includes an indentation complementary to the protrusion such that the OML surface and the OML surface of the adjacent composite panel form a continuous windswept surface. That is, the protrusion and the indentation interface with each other such that no gap is formed between the composite panel and the adjacent composite panel.

The systems and methods described herein are not limited to the specific examples described herein, but rather, components of the systems and/or steps of the methods may be utilized independently and separately from other components and/or steps described herein.

Although specific features of various examples of the disclosure may be shown in some drawings and not in others, this is for convenience only. In accordance with the principles of the disclosure, any feature of a drawing may be referenced and/or claimed in combination with any feature of any other drawing.

As used herein, an element or step recited in the singular and proceeded with the word "a" or "an" should be understood as not excluding plural elements or steps unless such exclusion is explicitly recited. Furthermore, references to "one example" of the present disclosure or "an example" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of manufacturing a composite panel for an air vehicle having a predetermined size and shape, the method comprising:
forming a frame including an outer mold line surface and at least one edge extending from the outer mold line surface, the outer mold line surface includes an outer mold line inner surface and a windswept surface opposite the outer mold line inner surface, the edge includes an edge inner surface, an edge outer surface opposite the edge inner surface, and a plurality of edge projections extending from the edge inner surface, wherein the outer mold line inner surface and the edge inner surface define a cavity;
positioning a plurality of uncured plies within the cavity, wherein the outer mold line inner surface and the edge inner surface support the uncured plies during a curing process;
securing the plies within the cavity using the edge projections; and
curing the uncured plies using the curing process, wherein a post-cure size and shape of the cured plies and the frame corresponds to the predetermined size and shape without trimming any of the cured plies.

2. The method of claim 1 further comprising forming a support structure and a connecting structure coupled to the support structure and the edge outer surface, wherein the support structure and the connecting structure are configured to support the edge during the curing process.

3. The method of claim 2 further comprising removing the support structure and the connecting structure from the frame by breaking the connecting structure.

4. The method of claim 3, wherein the connecting structure comprises a frangible connection, and wherein breaking the connecting structure comprises manually breaking the connecting structure.

5. The method of claim 2, wherein forming the connecting structure comprises additive manufacturing a thin strip of composite material coupled to the support structure and the edge outer surface.

6. The method of claim 1, wherein forming the frame comprises forming the frame by an additive manufacturing process.

7. The method of claim 6, wherein the additive manufacturing process comprises:
consolidating successive layers of a powdered build material to form the outer mold line surface;
consolidating successive layers of the powdered build material to form the edge; and
simultaneously depositing successive layers of unconsolidated powdered build material around the edge to form an edge support structure.

8. The method of claim 1, wherein the windswept surface comprises a smooth windswept surface.

9. The method of claim 1, the windswept surface comprises a textured windswept surface.

10. The method of claim 9, wherein the textured windswept surface includes at least one of a dimpled windswept surface, a wear strip, and a ridged windswept surface.

11. The method of claim 1 further comprising chemically and mechanically interacting the edge projections with the plies to secure the plies within the cavity.

12. A composite panel for an air vehicle, the composite panel comprising:
an outer mold line surface including an outer mold line inner surface, a windswept surface opposite the outer mold line inner surface;
an edge extending along at least a portion of the outer mold line surface, the edge includes an edge inner surface, an edge outer surface opposite the edge inner surface, and a plurality of edge projections extending from the edge inner surface, wherein the outer mold line inner surface and the edge inner surface define a cavity; and
plies positioned within the cavity, the plies have an outer edge that is untrimmed, wherein the edge outer surface is an outer perimeter of the composite panel, wherein the edge projections are configured to secure the plies within the cavity.

13. The composite panel of claim 12, wherein the outer mold line surface further includes a plurality of outer mold line surface projections extending from the OML inner surface, and wherein the outer mold line surface projections are configured to secure the plies within the cavity.

14. The composite panel of claim 12, wherein the windswept surface includes a smooth windswept surface.

15. The composite panel of claim 12, wherein the windswept surface includes a textured windswept surface.

16. The composite panel of claim 15, wherein the textured windswept surface includes at least one of a dimpled windswept surface, a wear strip, and a ridged windswept surface.

17. A composite panel system for an air vehicle, the composite panel system comprising:
a first composite panel comprising:
a first outer mold line surface including a first edge extending along at least a portion of the first outer mold line surface, the first outer mold line surface and the first edge define a first cavity, the first edge includes a first inner surface, a first outer surface opposite the first inner surface, and a plurality of first edge projections extending from the first inner surface, the first outer surface includes a protrusion extending from the first outer surface having a protrusion shape; and
first plies positioned within the first cavity, wherein the first edge projections are configured to secure the first plies within the first cavity; and
a second composite panel positioned adjacent the first composite panel, the second composite panel comprising:
a second outer mold line surface including a second edge extending along at least a portion of the second outer mold line surface, the second outer mold line surface and the second edge define a second cavity, the second edge includes a second inner surface, a second outer surface opposite the second inner surface, and a plurality of second edge projections extending from the second inner surface, the second outer surface defines an indentation having an indentation shape complementary to the protrusion shape such that the first outer mold line surface and the second outer mold line surface form a continuous windswept surface; and second plies positioned within the second cavity, wherein the second edge projections are configured to secure the second plies within the second cavity.

18. The composite panel system of claim 17, wherein the protrusion shape includes a triangular shaped protrusion extending from the first outer surface.

19. The composite panel system of claim 18, wherein the indentation shape includes a triangular shaped indentation complementary to the triangular shaped protrusion.

20. The composite panel system of claim 17, wherein the protrusion shape includes a semi-circular shaped protrusion extending from the first outer surface, and the indentation shape includes a semi-circular shaped indentation complementary to the semi-circular shaped protrusion.

* * * * *